(12) United States Patent
Hu et al.

(10) Patent No.: US 10,977,140 B2
(45) Date of Patent: Apr. 13, 2021

(54) FAULT TOLERANT DISTRIBUTED SYSTEM TO MONITOR, RECOVER AND SCALE LOAD BALANCERS

(71) Applicant: INTERNATIONAL BUSINESS MACHINES CORPORATION, Armonk, NY (US)

(72) Inventors: Zhenwei Hu, Pleasanton, CA (US); Jayakrishna Kidambi, San Jose, CA (US); Suryanarayan Ramamurthy, Sunnyvale, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 211 days.

(21) Appl. No.: 16/182,341

(22) Filed: Nov. 6, 2018

(65) Prior Publication Data

US 2020/0142788 A1    May 7, 2020

(51) Int. Cl.
*G06F 11/00* (2006.01)
*G06F 11/20* (2006.01)
*G06F 9/50* (2006.01)
*G06F 9/455* (2018.01)

(52) U.S. Cl.
CPC ...... *G06F 11/2023* (2013.01); *G06F 9/45558* (2013.01); *G06F 9/5083* (2013.01); *G06F 2009/45595* (2013.01); *G06F 2201/805* (2013.01); *G06F 2201/815* (2013.01)

(58) Field of Classification Search
CPC ............... G06F 11/2023; G06F 11/203; G06F 2009/4557; G06F 9/5083
See application file for complete search history.

(56) References Cited

U.S. PATENT DOCUMENTS

| 8,671,194 B2 | 3/2014 | Sangra et al. |
| 8,868,711 B2 | 10/2014 | Skjolsvold et al. |
| 10,257,095 B2 * | 4/2019 | Jain ...................... H04L 47/125 |
| 10,608,881 B2 * | 3/2020 | Teng ................... H04L 41/0893 |

(Continued)

OTHER PUBLICATIONS

Li et al., Auto-Scaling Web Applications in Hybrid Cloud Based on Docker, 2016 5th International Conference on Computer Science and Network Technology (ICCSNT) (Year: 2016).*

*Primary Examiner* — Elmira Mehrmanesh
(74) *Attorney, Agent, or Firm* — Christopher Pignato, Esq.; Wayne F. Reinke, Esq.; Heslin Rothenberg Farley & Mesiti P.C.

(57) ABSTRACT

Managing traffic on a distributed system includes partitioning VCE load balancers of the distributed system among service virtual server instances (SVSIs) of the distributed system, each service virtual server instance (SVSI) being identical in function and deployed across two or more regions of the distributed system. The method further includes: periodically polling, by each SVSI each other of the SVSIs; monitoring, by each SVSI, a load on each VCE load balancer for which it is responsible, resulting in a monitored load; recovering, by an SVSI from a failure of VCE load balancer(s) for which it is responsible; automatically adjusting, by an SVSI a capacity of a VCE load balancer for which it is responsible based on a corresponding monitored load; and repartitioning, by the distributed system, in response to an SVSI failure, the VCE load balancers among remaining SVSIs.

20 Claims, 11 Drawing Sheets

(56) References Cited

U.S. PATENT DOCUMENTS

| | | | |
|---|---|---|---|
| 10,635,500 B2* | 4/2020 | Skjolsvold | G06F 16/278 |
| 10,693,948 B2* | 6/2020 | Neogi | H04L 43/16 |
| 2006/0080273 A1* | 4/2006 | Degenaro | G06F 9/5055 |
| 2009/0300210 A1* | 12/2009 | Ferris | G06F 9/45533 |
| | | | 709/235 |
| 2012/0158938 A1 | 6/2012 | Shimonishi et al. | |
| 2016/0048408 A1* | 2/2016 | Madhu | G06F 11/2056 |
| | | | 718/1 |
| 2017/0264550 A1* | 9/2017 | Larose | H04L 47/24 |
| 2017/0285982 A1* | 10/2017 | DeArment | G06F 9/4843 |
| 2018/0203744 A1* | 7/2018 | Wiesmaier | G06F 9/4881 |
| 2018/0321918 A1* | 11/2018 | McClory | H04L 63/0281 |
| 2019/0173736 A1* | 6/2019 | Ponnuswamy | H04L 41/145 |
| 2020/0099610 A1* | 3/2020 | Heron | H04L 45/04 |

* cited by examiner

FAULT TOLERANT DISTRIBUTED SYSTEM TO MONITOR, RECOVER AND SCALE LOAD BALANCERS

BACKGROUND

Increasingly, companies are choosing to move their computer processes into the cloud, hosted by a provider. With the provider offering such services to multiple clients, a number of things can go wrong, resulting in degraded service availability. For example, failures can occur potentially leading to dropped traffic, which can pose problems for the client's business.

Virtualized computing environments (VCEs) are known. VCEs can be stored as "images." A new active instance of the VCE can be instantiated from the image. Two types of VCEs are virtual machines and containers. A container is a VCE that uses operating-system-level virtualization. This refers to an operating system feature in which the kernel allows the existence of multiple isolated user-space instances, called containers. This isolated user-space instances may look like real computers from the point of view of programs running in them. A computer program running on an ordinary operating system can see all resources (connected devices, files and folders, network shares, CPU power, quantifiable hardware capabilities) of that computer. However, programs running inside a container can only see the container's contents and devices assigned to the container.

Server virtualization is known. Server virtualization occurs when data and instructions that would normally be stored, processed, performed and/or communicated by a physical server computer are instead operated: (i) from within a VCE, or (ii) from within duplicative VCEs, with each VCE acting as a physical server would in a more traditional computing environment.

Virtual server instances (VSIs) are known. As the term is used herein a "virtual server instance" is data indicating a mapping between: (i) VCEs in a virtualized server system (for example, a data center with a very large number of running VCEs that act as servers); and (ii) physical hardware, physical locations and/or logical locations where the respective VCEs are currently running. The management of the number and configurations of VCEs and the mapping between VCEs and physical hardware (initially and on an on-going basis as mappings change) is sometimes herein referred to as VCE management.

Load balancers are known. A load balancer (sometimes herein "loadbalancer") is any computer system or subsystem that performs load balancing. Load balancing improves the distribution of workloads across multiple computing resources, such as computers, a computer cluster, network links, central processing units, or disk drives. Load balancing attempts to balance performance characteristics, such as resource use, maximize throughput, minimize response time, and avoid overload of any single resource. Computing systems that use multiple components having workloads controlled by load balancing, instead of a single component, tends to increase reliability and availability. Load balancing usually involves dedicated software or hardware, such as a multilayer switch or a Domain Name System server process. Load balancing differs from channel bonding in that load balancing divides traffic between network interfaces on a network socket (OSI model layer 4) basis, while channel bonding implies a division of traffic between physical interfaces at a lower level, either per packet (OSI model Layer 3) or on a data link (OSI model Layer 2) basis with a protocol like shortest path bridging.

In virtualized server systems, load balancing is typically performed by a VCE load balancer as part of VCE management. For example, if three separate VCEs are currently acting as identical servers for client requests, then the VCE load balancer makes sure that incoming client requests are divided among and between these three VCEs proportional to their computational capacity and/or other factors.

SUMMARY

Shortcomings of the prior art are overcome and additional advantages are provided through the provision, in one aspect, of a method of managing traffic on a distributed system. The method includes: partitioning a plurality of VCE load balancers of the distributed system among a plurality of service virtual server instances (SVSIs) of the distributed system, each service virtual server instance (SVSI) being identical in function and deployed across two or more regions of the distributed system; periodically polling, by each SVSI of the plurality of SVSIs, each other of the plurality of SVSIs; monitoring, by each SVSI, a load on each VCE load balancer for which it is responsible, resulting in a monitored load; recovering, by an SVSI of the plurality of SVSIs, from a failure of one or more VCE load balancers for which it is responsible; automatically adjusting, by an SVSI of the plurality of SVSIs, a capacity of a VCE load balancer for which it is responsible based on a corresponding monitored load; and repartitioning, by the distributed system, in response to an SVSI failure, the plurality of VCE load balancers among remaining SVSIs of the plurality of SVSIs.

In another aspect, a distributed system for managing traffic may be provided. The distributed system includes a plurality of service virtual server instances (SVSIs), each service virtual server instance (SVSI) being identical in function and deployed across two or more regions of the distributed system; and a plurality of VCE load balancers, wherein the distributed system is configured to partition the plurality of VCE load balancers among the plurality of SVSIs; and each SVSI of the plurality of SVSIs is configured to: periodically poll each other of the plurality of SVSIs; monitor a load on each VCE load balancer for which it is responsible, resulting in a monitored load; recover from a failure of one or more VCE load balancers for which it is responsible; automatically adjust a capacity of a VCE load balancer for which it is responsible, based on the monitored load; and wherein the distributed system is further configured to repartition, in response to a SVSI failure, the plurality of VCE load balancers among remaining SVSIs of the plurality of SVSIs.

In a further aspect, a method may be provided. The method comprises: defining a plurality of geographic regions; for each geographic region of the plurality of geographic regions: deploying a plurality of load balancer programs on a plurality of load balancer host computers; deploying at least one load balancer manager program on a set of load balancer manager host computer(s); instantiating a plurality of virtual server instances on a plurality of virtual server instance host computers; performing by each given loadbalancer program of the plurality of loadbalancer programs of each geographic region of the plurality of geographic regions at least the following operation(s): intercepting and routing client requests among a plurality of virtual server instances in order to balance processing of the client requests; performing by each given loadbalancer manager program of the set of loadbalancer manager program(s) of each geographic region of the plurality of geographic regions at least the following operation(s): monitoring a load on one or more load balancer program and horizontally scaling the one or more load balancer program based on the load; and performing by each given virtual service instance of the plurality of virtual service instance of each geographic region of the plurality of geographic regions at least the following operation(s): processing one or more client request of the client requests routed to the given virtual server instance.

Further, services relating to one or more aspects are also described and may be claimed herein.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
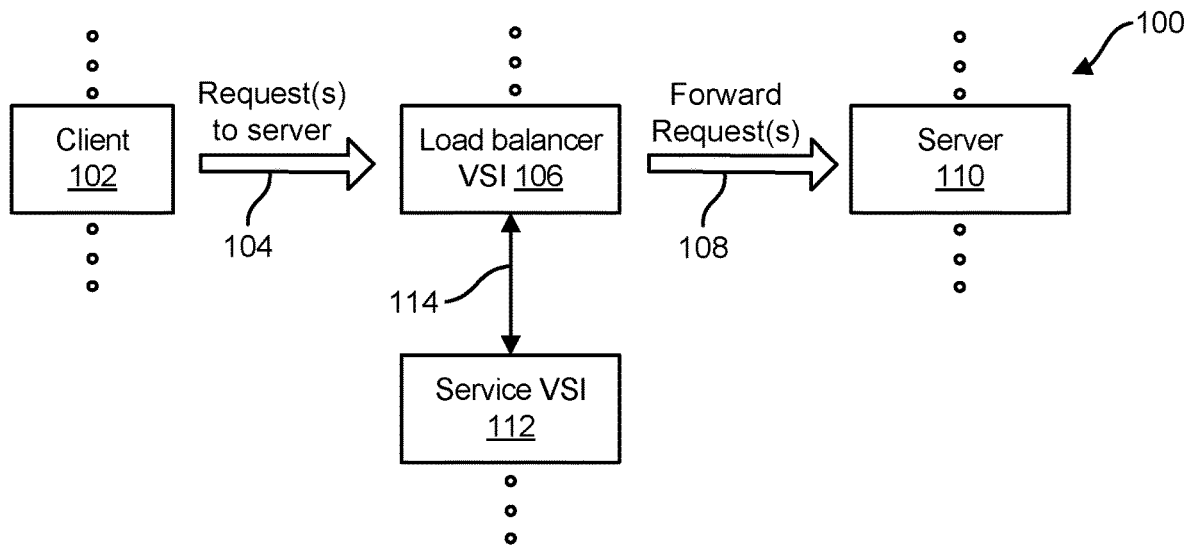
FIG. 1 is a block diagram for one example of a distributed system, in accordance with one or more aspects of the present disclosure.

One or more aspects of this disclosure relate, in general, to managing traffic in a distributed system. More specifically, one or more aspects of this disclosure relate to managing Virtual Computing Environment (VCE) load balancers.

Disclosed herein, in accordance with one or more aspects of the present invention, is a VCE load balancer traffic (i.e., application requests) management method for a distributed system (or just "system"), which can, in one embodiment, be a service deployed, in one example, in the cloud. A cloud load balancer consists of one or more Virtual Server Instance (VSI). A failure, in the context of the distributed system described herein, is any event that causes customer traffic to be dropped. Examples of failures include: network failures resulting in unreachable load balancers; hypervisor or Service VSI (SVSI) related failures which result in the SVSIs being unable to perform the service; DNS failures resulting in load balancer hostname not being resolved; and VCE load balancer failures. Human intervention results in delayed recovery and is only chosen as a last resort when automated recovery is unable to restore the service. The traffic on the VCE load balancers of the distributed system is continuously monitored. When failures are detected, which could result in possible service disruptions, the service is automatically recovered. When the traffic to a VCE load balancer exceeds the capacity of the VCE load balancer, it is scaled up automatically. When the capacity of the VCE load balancer exceeds the traffic to the VCE load balancer, the VCE load balancer capacity is scaled down automatically.

To achieve the above functions, the system is horizontally scalable so that when the number of VCE load balancers deployed increases, the system capacity can easily be increased. The System is also be capable of surviving failures so that the functions of monitoring, recovery, and scaling (or elasticity) of the VCE load balancers can continue in spite of such failures. Such failures include, for example, failures of VCE load balancers and failures of SVSIs.

The system functions correctly as long as a majority of the components are active and connected (not failed). When there are network failures resulting in a partition (split-brain), the system behaves in a consistent manner, which implies that SVSI members of a minority partition (e.g., SVSIs and VCE load balancers), cease to operate until the partition is healed.

As used herein, the term "scaling," "elastic" or formatives of either refers to automatically adjusting (i.e., increasing or decreasing) VCE load balancer capacity of a distributed system. In one embodiment, the VCE load balancer capacity is adjusted by adding or removing VCE load balancers, respectively (i.e., horizontal scaling).

As used herein, the term "healthy" refers to a virtual machine or VSI (including VCE load balancers and service VSIs) functioning properly.

As used herein, the term "service virtual server instance" (SVSI) refers to a virtual server instance (a.k.a., virtual machine) offered as a service, for example, in the cloud and which manages VCE load balancer capacity in a distributed computer system (or just "distributed system").

The term "regions," as used herein, refers to two or more different physical locations remote from one another, but part of the same distributed system. For example, the two or more regions may include North America and Europe.

As used herein, the term "partition" or "partitioning" with respect to VCE load balancers, refers to assigning VCE load balancers to SVSIs according to a predetermined partitioning algorithm by the SVSIs themselves (stateless scenario) or by the master SVSI (stateful scenario), both scenarios subsequently described in greater detail below.

Approximating language that may be used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable or suitable. For example, in some circumstances, an event or capacity can be expected, while in other circumstances the event or capacity cannot occur—this distinction is captured by the terms "may" and "may be."

Spatially relative terms, such as "beneath," "below," "lower," "above," "upper," and the like, may be used herein for ease of description to describe one element's or feature's relationship to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" or "over" the other elements or features. Thus, the example term "below" may encompass both an orientation of above and below. The device may be otherwise oriented (e.g., rotated 90 degrees or at other orientations) and the spatially relative descriptors used herein should be interpreted accordingly. When the phrase "at least one of" is applied to a list, it is being applied to the entire list, and not to the individual members of the list.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage medium(s) having computer readable program code embodied thereon.

The present invention may be a system, a method, and/or a computer program product at any possible technical detail level of integration. The computer program product may include a computer readable storage medium (or media) having computer readable program instructions thereon for causing a processor to carry out aspects of the present invention.

A distributed system of Service VSIs is designed to perform the monitoring, recovery, and elastic scaling functions. Each service VSI is identical in function. Two or more Service VSIs are deployed across multiple regions. The system uses a consensus protocol, for example, the Paxos protocol. Where the SVSIs are stateful, a master SVSI is designated and a master lease is obtained by the master SVSI, the lease being periodically renewed. The master SVSI partitions VCE load balancers of the system among the SVSIs. Where the SVSIs are stateless, each SVSI discovers and partitions its own VCE load balancers using a common partitioning algorithm. Each SVSI indicates its health status by periodically writing to a consensus protocol state-variable, for example. The master periodically obtains all the VCE load balancers and partitions them amongst healthy members, and writes that to a consensus protocol state-variable, for example. Such a partitioning could use consistent-hashing or some other method depending on the properties of the service-VSI and the VCE load balancer. Each service-VSI obtains the VCE load balancer it is responsible for through the consensus protocol state variable, and performs monitoring, recovery and scaling operations on it, as described herein.

In one example, the consensus protocol may be a Paxos protocol. Paxos is a family of protocols for solving consensus in a system (or network); in this case, a distributed system. Consensus is the process of agreeing on one result among a group of participants. In this case, the participants are SVSIs. Agreeing becomes difficult when the participants or their communication medium may experience failures.

Consensus protocols generally are the basis for the state machine replication approach to distributed computing. State machine replication is a technique for converting an algorithm into a fault-tolerant, distributed implementation.

The Paxos family of protocols includes a spectrum of trade-offs between the number of processors, the number of message delays before learning the agreed value, the activity level of individual participants, the number of messages sent and the various types of failures. Although no deterministic fault-tolerant consensus protocol can guarantee progress in an asynchronous network, Paxos provides consistency and the conditions that could prevent it from making progress are difficult to provoke.

Paxos describes the actions of the processors by their roles in the protocol: client, acceptor, proposer, learner, and leader, as subsequently described in more detail. In one example implementation, a single processor may play one or more roles at the same time. This does not affect the correctness of the protocol—it is usual to coalesce roles to improve the latency and/or number of messages in the protocol.

Clients issue requests to the distributed system, and wait for a response. For instance, write requests on files in a distributed file server.

Acceptors act as the fault-tolerant "memory" of the protocol. Acceptors are collected into groups called Quorums. Any message sent to an Acceptor must be sent to a Quorum of Acceptors. Any message received from an Acceptor is ignored unless a copy is received from each Acceptor in a Quorum.

A Proposer advocates a client request, attempting to convince the Acceptors to agree on it, and acting as a coordinator to move the protocol forward when conflicts occur.

Learners act as the replication factor for the protocol. Once a Client request has been agreed on by the Acceptors, the Learner may take action, for example, executing the request and sending a response to the Client. To improve the availability of processing, additional Learners can be added.

Paxos requires a distinguished Proposer (known as the Leader) to make progress. While many processes may think they are leaders, the protocol only guarantees progress if one of them is eventually chosen. If two processes believe they are leaders, they may stall the protocol by continuously proposing conflicting updates. However, the safety properties are still preserved in that case.

In basic Paxos, a Proposer (the leader) creates a proposal identified with a number N. This number must be greater than any previous proposal number used by this Proposer. Then, it sends a Prepare message containing this proposal to a Quorum of Acceptors. The Proposer decides who is in the Quorum. If the proposal's number N is higher than any previous proposal number received from any Proposer by the Acceptor, then the Acceptor must return a promise to ignore all future proposals having a number less than N. If the Acceptor accepted a proposal at some point in the past, it must include the previous proposal number and previous value in its response to the Proposer. Otherwise, the Acceptor can ignore the received proposal. It does not have to answer in this case for Paxos to work. However, for the sake of optimization, sending a denial (Nack) response would tell the Proposer that it can stop its attempt to create consensus with proposal N.

If a Proposer receives enough promises from a Quorum of Acceptors, it needs to set a value to its proposal. If any Acceptors had previously accepted any proposal, then they'll have sent their values to the Proposer, who now must set the value of its proposal to the value associated with the highest proposal number reported by the Acceptors. If none of the Acceptors had accepted a proposal up to this point, then the Proposer may choose the value it originally chose 'N'. The Proposer sends an Accept Request message to a Quorum of Acceptors with the chosen value for its proposal.

If an Acceptor receives an Accept Request message for a proposal N, it must accept it if and only if it has not already promised to only consider proposals having an identifier greater than N. In this case, it should register the corresponding value v and send an Accepted message to the Proposer and every Learner. Otherwise, it can ignore the Accept Request.

Note that an Acceptor can accept multiple proposals. These proposals may even have different values in the presence of certain failures. However, the Paxos protocol will guarantee that the Acceptors will ultimately agree on a single value.

Rounds fail when multiple Proposers send conflicting Prepare messages, or when the Proposer does not receive a Quorum of responses (Promise or Accepted). In these cases, another round must be started with a higher proposal number.

Note that when Acceptors accept a request, they also acknowledge the leadership of the Proposer. Hence, Paxos can be used to select a leader in a cluster of nodes.

A deployment of Paxos may require a continuous stream of agreed values acting as commands to a distributed state machine. If each command is the result of a single instance of the Basic Paxos protocol, a significant amount of overhead would result.

If the leader is relatively stable, the proposal and promise phases may not be necessary. Thus, it is possible to skip these phases for future instances of the Paxos protocol with the same leader.

FIG. 1 depicts a modified block/flow diagram 100 of a portion of a distributed computer system, in accordance with one or more aspects of the present disclosure. A client 102 generates 104 request(s) destined for a server. The request(s) are intercepted by a VCE load balancer 106 for forwarding 108 to a server (e.g., server 110), chosen by the VCE load balancer to maintain a balanced load across a group of servers, of which server 110 is a part. A service VSI 112 monitors the health and other desired metric(s) of the VCE load balancer over bidirectional communications path 114. Although only one entity in the various types of entities is shown (i.e., one client, one server, etc.), it will be understood that many others are also present in the distributed system; showing individual entities merely simplifies the description of the flow of requests and the relative arrangement of entities.

A VCE load balancer is primarily implemented in computer networking processes that distribute and manage loads across several devices, resources and services to increase network performance. A VCE load balancer is implemented through software and hardware. A software VCE load balancer may be a DNS load balancing solution, software-based switch or router that evenly balances network traffic between different devices and network connections. Similarly, hardware-based VCE load balancers are in the form of physical switches, routers or servers that manage the workload distribution within several devices to reduce or normalize overall load.

In computing, load balancing improves the distribution of workloads across multiple computing resources, such as computers, a computer cluster, network links, central processing units, or disk drives. Load balancing aims to optimize resource use, maximize throughput, minimize response time, and avoid overload of any single resource. Using multiple components with load balancing instead of a single component may increase reliability and availability through redundancy. Load balancing usually involves dedicated software or hardware, such as a multilayer switch or a Domain Name System server process.

Load balancing differs from channel bonding in that load balancing divides traffic between network interfaces on a network socket (OSI model layer 4) basis, while channel bonding implies a division of traffic between physical interfaces at a lower level, either per packet (OSI model Layer 3) or on a data link (OSI model Layer 2) basis with a protocol like shortest path bridging.

One of the most commonly used applications of load balancing is to provide a single Internet service from multiple servers, sometimes known as a server farm. Commonly load-balanced systems include popular web sites, large Internet Relay Chat networks, high-bandwidth File Transfer Protocol sites, Network News Transfer Protocol (NNTP) servers, Domain Name System (DNS) servers, and databases.

An alternate method of load balancing, which does not require a dedicated software or hardware node, is called round robin DNS. In this technique, multiple IP addresses are associated with a single domain name; clients are given IP in round robin fashion. IP is assigned to clients for a time quantum.

Another approach to load balancing is to deliver a list of server IPs to the client, and then to have client randomly select the IP from the list on each connection. This essentially relies on all clients generating similar loads, and the Law of Large Numbers to achieve a reasonably flat load distribution across servers. It has been claimed that client-side random load balancing tends to provide better load distribution than round-robin DNS; this has been attributed to caching issues with round-robin DNS, that in case of large DNS caching servers, tend to skew the distribution for round-robin DNS, while client-side random selection remains unaffected regardless of DNS caching.

With this approach, the method of delivery of list of IPs to the client can vary, and may be implemented as a DNS list (delivered to all the clients without any round-robin), or via hardcoding it to the list. If a "smart client" is used, detecting that randomly selected server is down and connecting randomly again, it also provides fault tolerance.

For Internet services, a server-side VCE load balancer is usually a software program that is listening on the port where external clients connect to access services. The VCE load balancer forwards requests to one of the "backend" servers, which usually replies to the VCE load balancer. This allows the VCE load balancer to reply to the client without the client ever knowing about the internal separation of functions. It also prevents clients from contacting back-end servers directly, which may have security benefits by hiding the structure of the internal network and preventing attacks on the kernel's network stack or unrelated services running on other ports.

Some VCE load balancers provide a mechanism for doing something special in the event that all backend servers are unavailable. This might include forwarding to a backup VCE load balancer, or displaying a message regarding the outage.

It is also important that the VCE load balancer itself does not become a single point of failure. Usually VCE load balancers are implemented in high-availability pairs which may also replicate session persistence data if required by the specific application.

Numerous scheduling algorithms, also called load-balancing methods, are used by VCE load balancers to determine which back-end server to send a request to. Simple algorithms include random choice, round robin, or least connections. More sophisticated VCE load balancers may take additional factors into account, such as a server's reported load, least response times, up/down status (determined by a monitoring poll of some kind), number of active connections, geographic location, capabilities, or how much traffic it has recently been assigned.

An important issue when operating a load-balanced service is how to handle information that must be kept across the multiple requests in a user's session. If this information is stored locally on one backend server, then subsequent requests going to different backend servers would not be able to find it. This might be cached information that can be recomputed, in which case load-balancing a request to a different backend server just introduces a performance issue.

Ideally the cluster of servers behind the VCE load balancer should be session-aware, so that if a client connects to any backend server at any time the user experience is unaffected. This is usually achieved with a shared database or an in-memory session database, for example Memcached.

One basic solution to the session data issue is to send all requests in a user session consistently to the same backend server. This is known as persistence or stickiness. A significant downside to this technique is its lack of automatic failover: if a backend server goes down, its per-session information becomes inaccessible, and any sessions depending on it are lost. The same problem is usually relevant to central database servers; even if web servers are "stateless" and not "sticky," the central database is (see below).

Assignment to a particular server might be based on a username, client IP address, or be random. Because of changes of the client's perceived address resulting from DHCP, network address translation, and web proxies this method may be unreliable. Random assignments must be remembered by the VCE load balancer, which creates a burden on storage. If the VCE load balancer is replaced or fails, this information may be lost, and assignments may need to be deleted after a timeout period or during periods of high load to avoid exceeding the space available for the assignment table. The random assignment method also requires that clients maintain some state, which can be a problem, for example when a web browser has disabled storage of cookies. Sophisticated VCE load balancers use multiple persistence techniques to avoid some of the shortcomings of any one method.

In the very common case where the client is a web browser, a simple but efficient approach is to store the per-session data in the browser itself. One way to achieve this is to use a browser cookie, suitably time-stamped and encrypted. Another is URL rewriting. Storing session data on the client is generally the preferred solution: then the VCE load balancer is free to pick any backend server to handle a request. However, this method of state-data handling is poorly suited to some complex business logic scenarios, where session state payload is big and recomputing it with every request on a server is not feasible. URL rewriting has major security issues, because the end-user can easily alter the submitted URL and thus change session streams.

A virtual computing environment is a software-based IT environment being hosted on another physical instance and is distributed, for example, as a service as in cloud computing's Instance as a Service (IaaS) delivery model. It provides organizations, particularly smaller ones, that cannot afford to build their own physical instance, access to enterprise-grade technology such as servers and applications. The distribution is often done via the cloud, meaning over large networks such as the Internet or large wide-area networks. As such, a virtual server instance (VSI) is a virtual server that may be hosted in the cloud. Also, a service VSI is a VSI used as part of a service to a third party. In one example, hosting of servers is a service, the service also including the elastic horizontal scaling of load balancers described herein.

The main purpose of a virtual instance is to bring enterprise-level technology to organizations that cannot afford the large capital required to pay for the hardware, software licenses, setup and continual maintenance of an actual data center instance. The technology involves virtualization, which is the utilization of physical server resources to host logical or virtual servers and networking hardware in order to optimize resources and drive costs down by hosting multiple virtual servers in a single host server.

The idea is that no single server is actually taxed enough to the point that its resource limits are reached so it would be more prudent to make use of these resources by running multiple logical servers that, together, can make use of the actual capacity of the host. This lean approach allows for sharing and distributing resources, which, in turn, promotes flexibility, scalability and lower total cost of ownership.

The benefits of a virtual computing environment (VCE) include, for example, that it is: scalable—allows provisioning as many or as few logical servers as required, and users only pay for what they use; flexible—allows for multiple server and networking configurations as compared to a hardwired physical instance, which requires more capital and effort to change; secure—allows more security to be layered on top of whatever security is already present in the VCE because all traffic to the VCE goes through the actual physical instance; load balancing—allows software-based servers to share workloads easily and distribute them properly so that no single logical server is taxed more than the others; and backup and recovery—promotes easier backups because everything can be saved somewhere, allowing for quick recovery in other hosts if a few hosts are down. This is almost impossible with physical servers, which have to be revived before services can resume.

In one example, each service VSI becomes known to other SVSIs by registering its own IP (Internet Protocol) address to a DNS (Domain Name System) hostname when it starts. Other service VSIs are discovered, for example, from the DNS.

In one example of a consensus protocol, service VSIs implement the multi-Paxos protocol for distributed state and consensus. Each service VSI serves as a Paxos-acceptor and Paxos-learner. A Paxos value includes, for example, the following items: a current master node IP, along with a timestamp; a health status (with timestamp) of each service-VSI; and partitioning of VCE load balancers to service-VSIs.

When the current Paxos-master lease has timed out (this can be determined from the latest Paxos value), each service VSI attempts to assert mastership by independently initiating a Paxos proposal. Such a Paxos instance will eventually resolve, assuming that each SVSI implements a random timeout. Eventually, one of the SVSIs becomes master and takes the master lease. The master periodically keeps renewing its lease by updating the master variable in the Paxos value.

Each SVSI periodically asserts its health status by writing to the health status item in the Paxos value. By looking at the latest learnt Paxos value, an SVSI, as well as the master, can determine which SVSIs are healthy.

The master Service VSI discovers the VCE load balancers by querying the DNS. Each VCE load balancer registers a DNS name containing associated IP addresses of component VCE load balancers. Based on the knowledge of which other Service VSIs are healthy, the master service VSI "partitions" the VCE load balancers to Service-VSIs using one of several heuristics. The simplest is to perform consistent-hashing, and more complicated partitioning methods may take into account the distance of the VCE load balancer region from the service-VSI or other such metrics.

A hash function or hashing takes a group of characters (called a key) and maps it to a value of a certain length (called a hash value or hash). The hash value is representative of the original string of characters, but is normally smaller than the original. Hashing is done for indexing and locating items in databases because it is easier to find the shorter hash value than the longer string. Hashing is also used in encryption. A hash function is also known as a hashing algorithm or message digest function.

Hashing is used with a database to enable items to be retrieved more quickly. Hashing can also be used in the encryption and decryption of digital signatures. The hash function transforms the digital signature, then both the hash value and signature are sent to the receiver. The receiver uses the same hash function to generate the hash value and then compares it to that received with the message. If the hash values are the same, it is likely that the message was transmitted without errors.

In some situations, it may be necessary or desirable to split a hash table into several parts, hosted by different servers. One of the main motivations for this is to bypass the memory limitations of using a single computer, allowing for the construction of arbitrarily large hash tables (given enough servers). In computing, a hash table (hash map) is a data structure that implements an associative array abstract data type, a structure that can map keys to values. A hash table uses a hash function to compute an index into an array of buckets or slots, from which the desired value can be found. In such a scenario, the objects (and their keys) are distributed among several servers, hence the name.

This distribution scheme is simple and intuitive, but as the number of servers changes, problems begin to arise. An example of a problem includes one of the servers crashing or becoming unavailable. Keys would need to be redistributed to account for the missing server. The same applies if one or more new servers are added to the pool; keys need to be redistributed to include the new servers.

Consistent Hashing is a distributed hashing scheme that operates independent of the number of servers or objects in a distributed hash table by assigning them a position on an abstract circle, or hash ring. Consistent hashing is based on mapping each object to a point on the edge of a circle (or equivalently, mapping each object to a real angle). The system maps each available machine (or other storage bucket) to many pseudo-randomly distributed points on the edge of the same circle. This allows servers and objects to scale without affecting the overall system.

To find where an object should be placed, the system finds the location of that object's key on the edge of the circle; then walks around the circle until falling into the first bucket it encounters (or equivalently, the first available bucket with a higher angle). The result is that each bucket contains all the resources located between each one of its points and the previous points that belong to other buckets.

If a bucket becomes unavailable (for example because the computer it resides on is not reachable), then the points it maps to will be removed. Requests for resources that would have mapped to each of those points now map to the next highest points. Since each bucket is associated with many pseudo-randomly distributed points, the resources that were held by that bucket will now map to many different buckets. The items that mapped to the lost bucket must be redistributed among the remaining ones, but values mapping to other buckets will still do so and do not need to be moved.

A similar process occurs when a bucket is added. By adding new bucket points, we make any resources between those and the points corresponding to the next smaller angles map to the new bucket. These resources will no longer be associated with the previous buckets, and any value previously stored there will not be found by the selection method described above.

The portion of the keys associated with each bucket can be altered by altering the number of angles that bucket maps to.

Once VCE load balancers are assigned to Service-VSIs, the master service VSI writes this to the Paxos value. Each service-VSI being a Paxos-learner gets the latest Paxos value, and thus learns the VCE load balancers it is responsible for.

Each service VSI then polls each VCE load balancer that it is responsible for every poll-interval. Such a poll can detect the following: a health of the VCE load balancer IPs; a health of VCE load balancer listeners; and a current traffic load on the VCE load balancer. When the service VSI detects a failure, it invokes recovery actions. Failure is detected by, for example, poll failures. When the service VSI detects traffic load exceeding the capacity of the VCE load balancer, it invokes scaling actions on the VCE load balancer. When the service VSI detects traffic load lower than the capacity of the VCE load balancer, it invokes scaling actions to reduce the capacity of the VCE load balancer.

Upon a failure of the service VSI, The master reassigns the VCE load balancers to the healthy remaining members. If the master fails, another service-VSI assumes mastership after its lease expires (obtained from the latest Paxos value)

As long as a majority of service-VSIs remain connected, the above approach ensures that the system will continue to work. If there is a network partition, then, nodes in a minority partition will not be able to reelect a master after the Paxos master expires. When this happens, the nodes will continue to monitor the VSIs they are responsible for but will not perform any "recover" or "scale" operation.

Using Paxos for consensus guarantees that only one service VSI will ever perform "recovery" or "scale" operations under any scenario of failures amongst the service VSIs, In case of a network partition with no partition containing a majority of nodes, then "recover" and "scale" operations become unavailable but monitoring can still continue to operate (with possibly more than one service VSI monitoring the same VCE load balancer).

Figure 2:
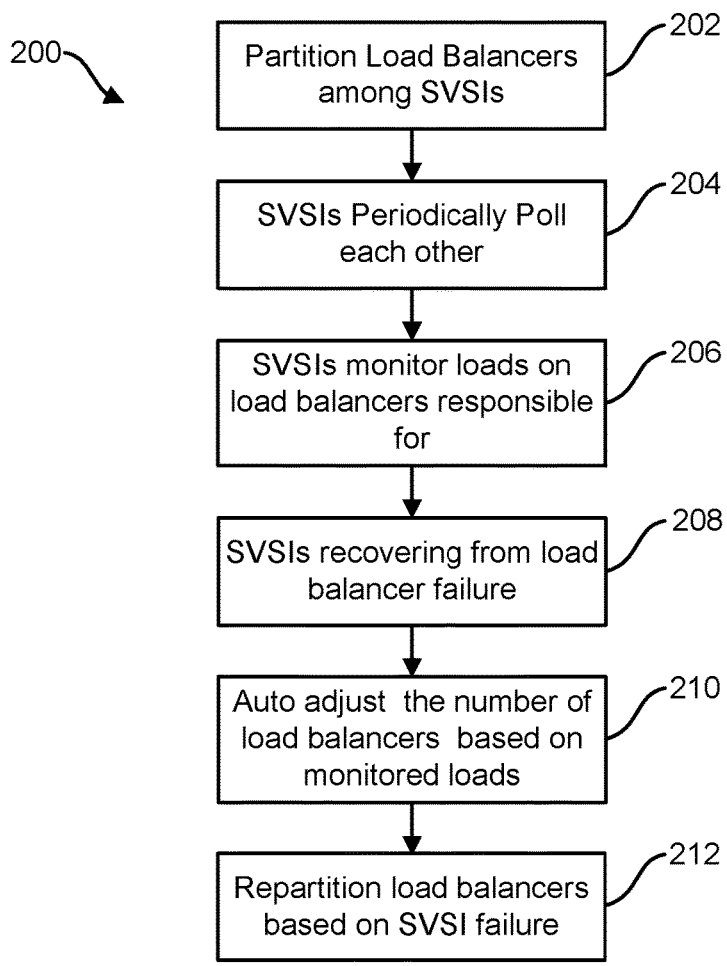
FIG. 2 is a flow diagram for one example of managing traffic on the distributed system of FIG. 1, in accordance with one or more aspects of the present disclosure.

FIG. 2 is a flow diagram 200 for one example of managing traffic on the distributed system 100 of FIG. 1, in accordance with one or more aspects of the present disclosure. The method of managing traffic includes, for example, partitioning 202 the VCE load balancers among the SVSIs. The SVSIs periodically poll 204 each other as to, for example, a current health status. The SVSIs proceed to monitor 206 loads on VCE load balancers each is responsible for. The SVSIs can recover 208 from VCE load balancer failures, for example, a failure to respond to a poll (e.g., a current VCE load balancer health). The method proceeds with automatically adjusting 210 load balance capacity based on the monitored loads of the VCE load balancers. For example, the associated SVSI may read the load balance provided by a given VCE load balancer and determine it is beyond a current reported capacity of the given VCE load balancer. The method continues with repartitioning 212 VCE load balancers based on SVSI failure.

Figure 3:
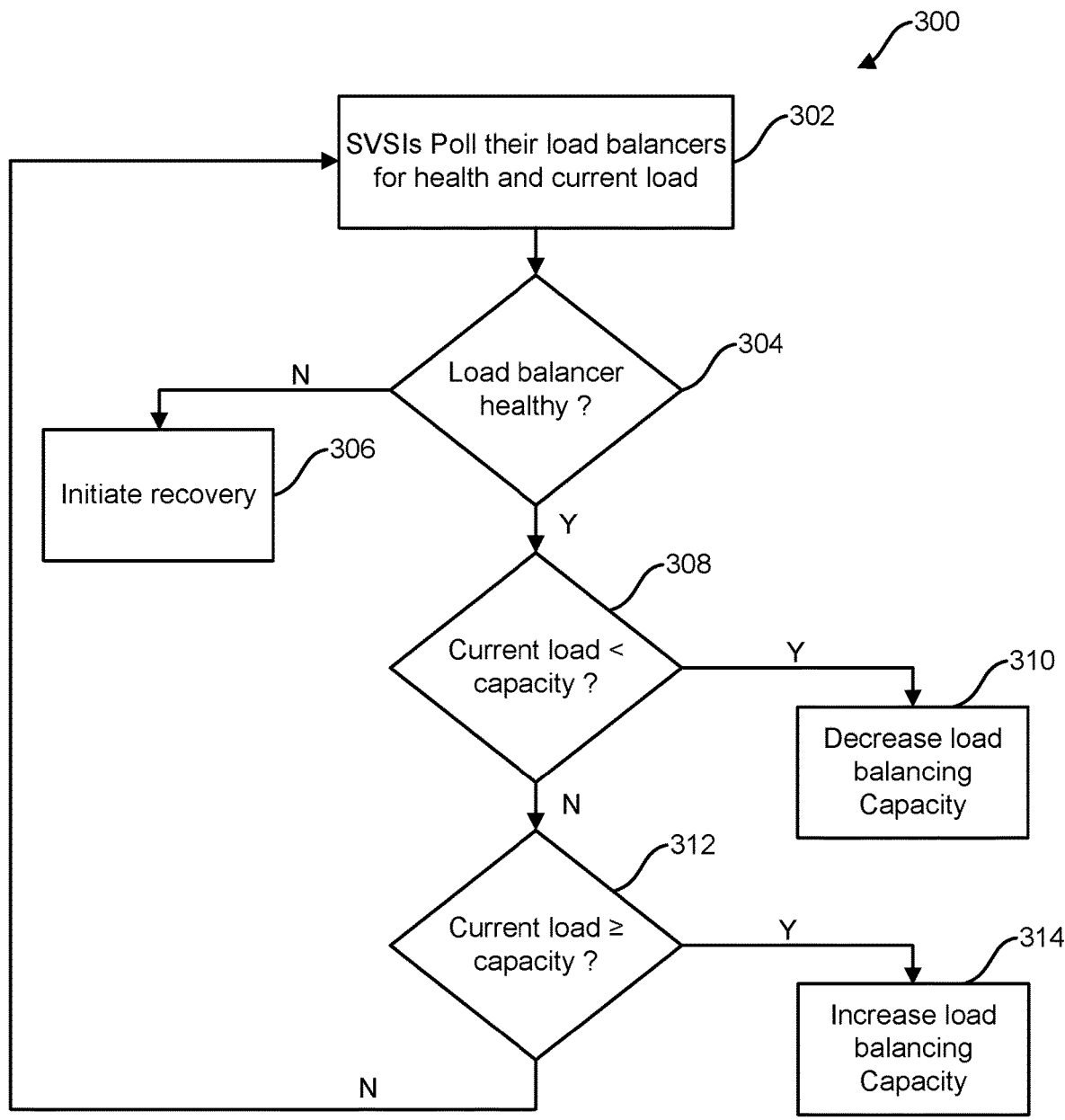
FIG. 3 is a flow diagram for one example of an SVSI managing a VCE load balancer for which the SVSI is responsible, in accordance with one or more aspects of the present disclosure.

FIG. 3 is a flow diagram 300 for one example of an SVSI managing traffic (load) on a given VCE load balancer for which the SVSI is responsible, in accordance with one or more aspects of the present disclosure. In flow diagram 300, the SVSIs poll 302 their VCE load balancers for health and current load information. An inquiry 304 is then made as to whether a given VCE load balancer is healthy. If the VCE load balancer is not healthy, the SVSI initiates 306 recovery of the VCE load balancer. If the VCE load balancer is healthy, an inquiry 308 is then made as to whether the current load is less than the capacity for the VCE load balancer. If the current load is less than the capacity, the SVSI decreases 310 the capacity of the VCE load balancer. If the current load is not less than capacity, then an inquiry 312 is made as to whether the current load is larger than or equal to the capacity. If the current load is larger than or equal to the capacity, the SVSI increases 314 the capacity of the VCE load balancer, using, for example, horizontal scaling by adding a VCE load balancer. If the current load is not larger than or equal to the capacity the method returns to polling of the VCE load balancers 302 during a polling period of the SVSI.

Figure 4:
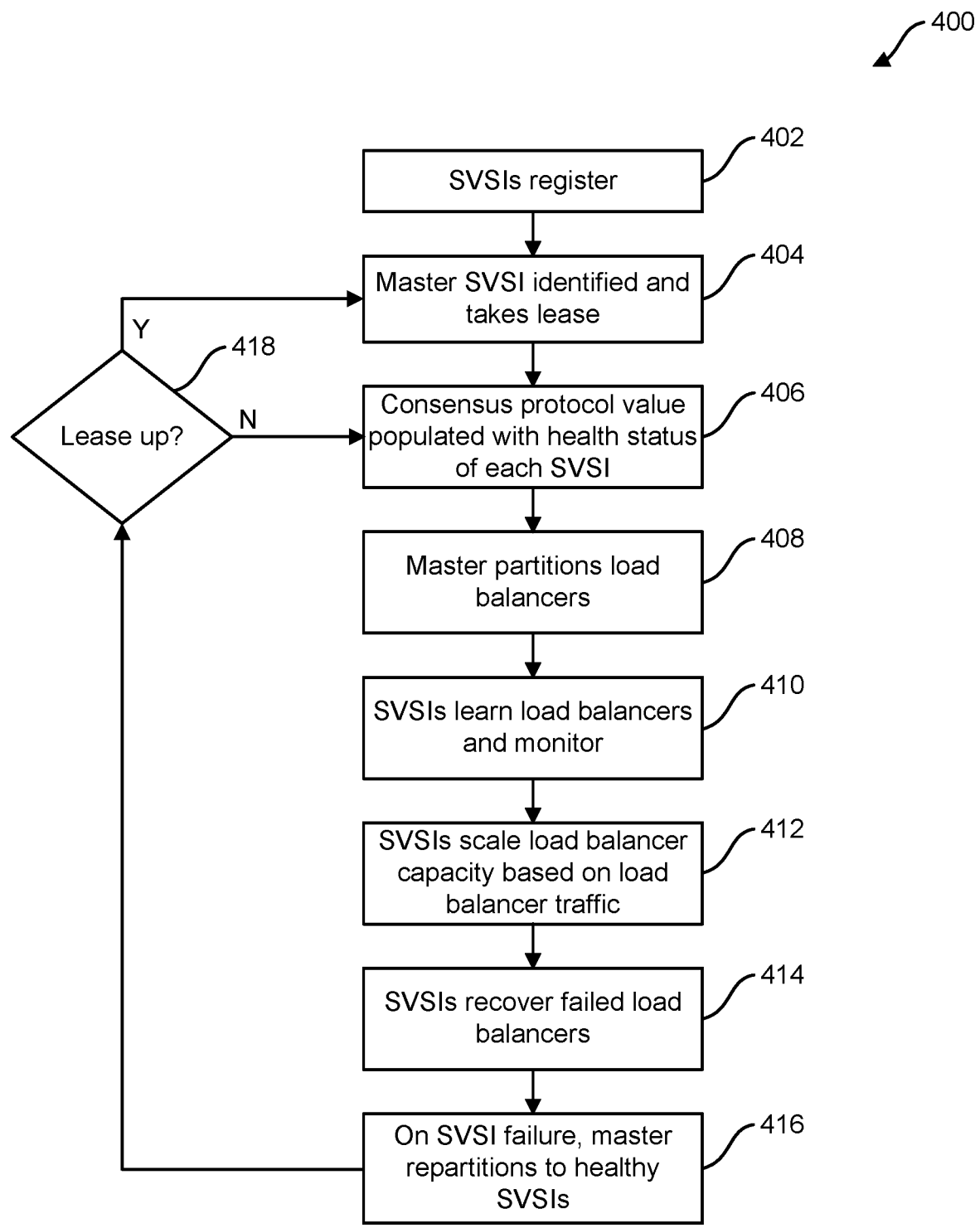
FIG. 4 is a flow diagram for one example of managing traffic in a distributed system using stateful SVSIs, in accordance with one or more aspects of the present disclosure.

FIG. 4 is a flow diagram 400 for one example of managing traffic in a distributed system using stateful SVSIs, in accordance with one or more aspects of the present disclosure. Upon startup of a distributed system, the service VSIs register 402. A master SVSI is identified 404 and takes a lease. In one example, all SVSIs attempt to become the master, but in the end, only one can become the master. A consensus protocol (e.g., a Paxos protocol) value is then populated 406 with a health status for each SVSI. In one example, each SVSI writes its health status to the consensus value. The master SVSI then partitions 408 the VCE load balancers to the service VSIs. In one non-limiting example, there is one VCE load balancer for each SVSI. However, other arrangements are possible, for example, an SVSI may be partitioned to more than one VCE load balancer. The SVSIs then each learn 410 which VCE load balancer(s) a given SVSI is partitioned for monitoring. In one example, the master SVSI writes the partitions to the consensus protocol value, and each SVSI reads its VCE load balancer (s) from that value. Based on the monitoring of the VCE load balancers by the SVSIs, in particular, a load on a given VCE load balancer, the SVSIs dynamically scale 412 the load balancer capacity by requesting to add/remove VCE load balancers (increasing capacity and decreasing capacity, respectively).

Figure 5:
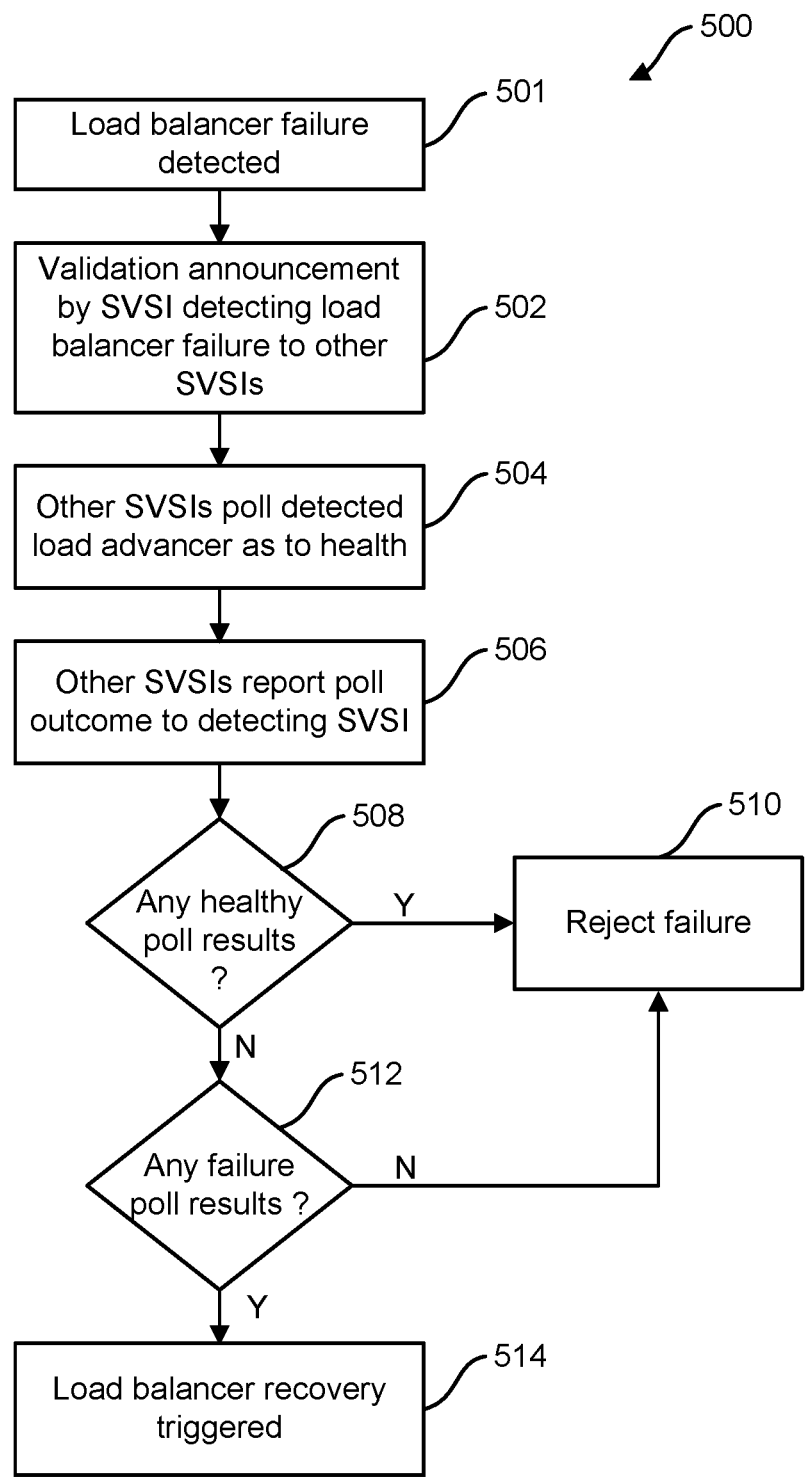
FIG. 5 is a flow diagram for one example of determining whether to initiate recovery of a VCE load balancer suspected of failing, in accordance with one or more aspects of the present invention.
Figure 6:
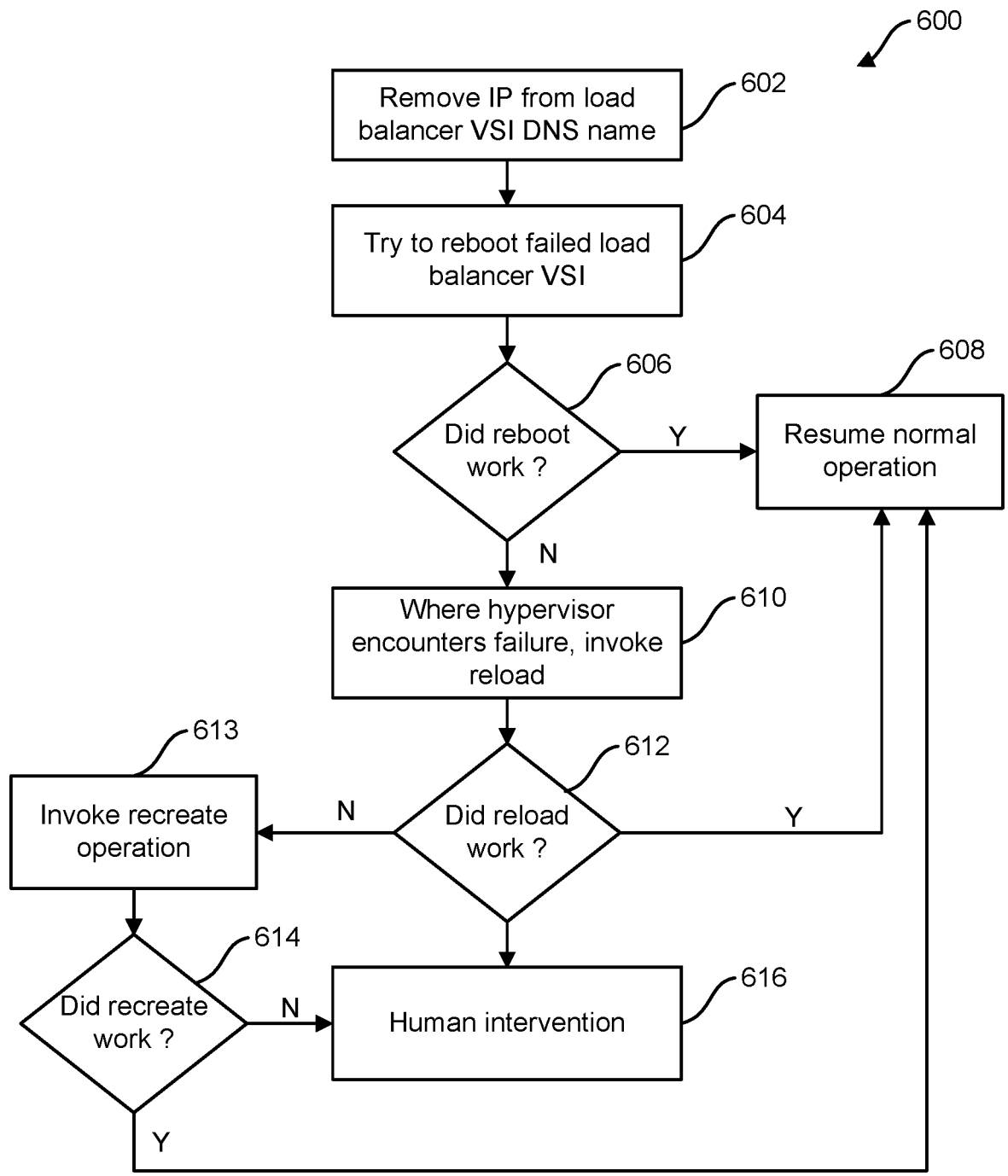
FIG. 6 is a flow diagram for one example of initiating recovery of a VCE load balancer, in accordance with one or more aspects of the present disclosure.

As part of the monitoring, the SVSIs may suspect their VCE load balancer(s) has failed, resulting in VCE load balancer recovery 414, described in detail with respect to FIGS. 5 and 6. If an SVSI fails, indicated, for example, by a failure of the SVSI to write its health to the consensus protocol value, the master SVSI repartitions 416 the load balancer SVSIs to healthy remaining SVSIs. An inquiry 418 is then made as to whether the master's lease is up; if so, a master SVSI is identified and takes a lease 404; if not, the method proceeds to SVSI health status population 406.

In an embodiment, a system of three or more service virtual server instances (SVSIs) in different geographical regions continuously validate traffic to the VCE load balancer and its listeners. When there are three nodes, one can fail, and there will still be a majority of nodes (two) remaining which ensures that the protocol can make progress. With two nodes, if one fails, then Paxos cannot make progress because there is no majority. Hence generally, to allow for failures, quorum protocols operate with an odd number of nodes (three, five, etc.). The VCE load balancers (also referred to herein as "VCE load balancer(s)" are partitioned among SVSIs so that, in one example, each VCE load balancer is monitored by one service virtual server instance (SVSI). Periodically, traffic to the VCE load balancer and its listeners is validated by sending a health poll to the VCE load balancer. In one example, a failure is detected when the health poll fails for a number of consecutive attempts.

FIG. 5 is a flow diagram for one example of determining whether to initiate recovery of a VCE load balancer suspected of failing, in accordance with one or more aspects of the present disclosure. Upon detecting 501 a failure in a VCE load balancer, a consensus protocol is started to validate the failure and avoid false-positives. Consensus on the VCE load balancer failure can confirm or reject the failure. The SVSI detecting the VCE load balancer failure announces 502 to the other SVSI to validate the failure. Upon receiving the announcement to validate a VCE load balancer failure, each SVSI performs 504 its own health check of the suspected VCE load balancer and reports 506 its results back to the SVSI asking for the validation. If any other SVSIs report a healthy VCE load balancer, inquiry 508, the failure is rejected 510 (i.e., a "yes" answer to inquiry 508). Also, if at least one SVSI confirms the failure, via inquiry 512, then recovery actions are triggered 514, i.e., a recovery action is initiated upon the failed load balancer SVSIs.

In one embodiment, a VCE load balancer recovery action sequentially performs steps of increasing complexity. FIG. 6 is a flow diagram for one example of initiating recovery of a VCE load balancer, in accordance with one or more aspects of the present disclosure. Initially, the failed SVSI IP address is removed 602 from the VCE load balancer DNS name so that future traffic is steered away from the failed SVSI, which, advantageously, immediately results in traffic recovery. An attempt is then made to reboot 604 the failed VCE load balancer SVSI. An inquiry 606 may then be made as to whether the reboot operation worked. If so, then normal operation is resumed 608. If the reboot operation fails (because, the hypervisor itself has encountered a failure), then, a reload operation 610 is invoked. An inquiry 612 is then made as to whether the reload operation worked. If so, normal operation may be resumed 608. If the reload operation fails (because, the hypervisor itself has encountered a failure), then a recreate operation is invoked 613. The recreate operation involves creating a new VCE load balancer on a different hypervisor. An inquiry 614 is then made as to whether the recreate operation worked. If the recreate operation worked, normal operation is resumed 608. If the recreate operation encounters a failure, then all automated recovery methods are exhausted, and human intervention 616 is invoked.

Figure 7:
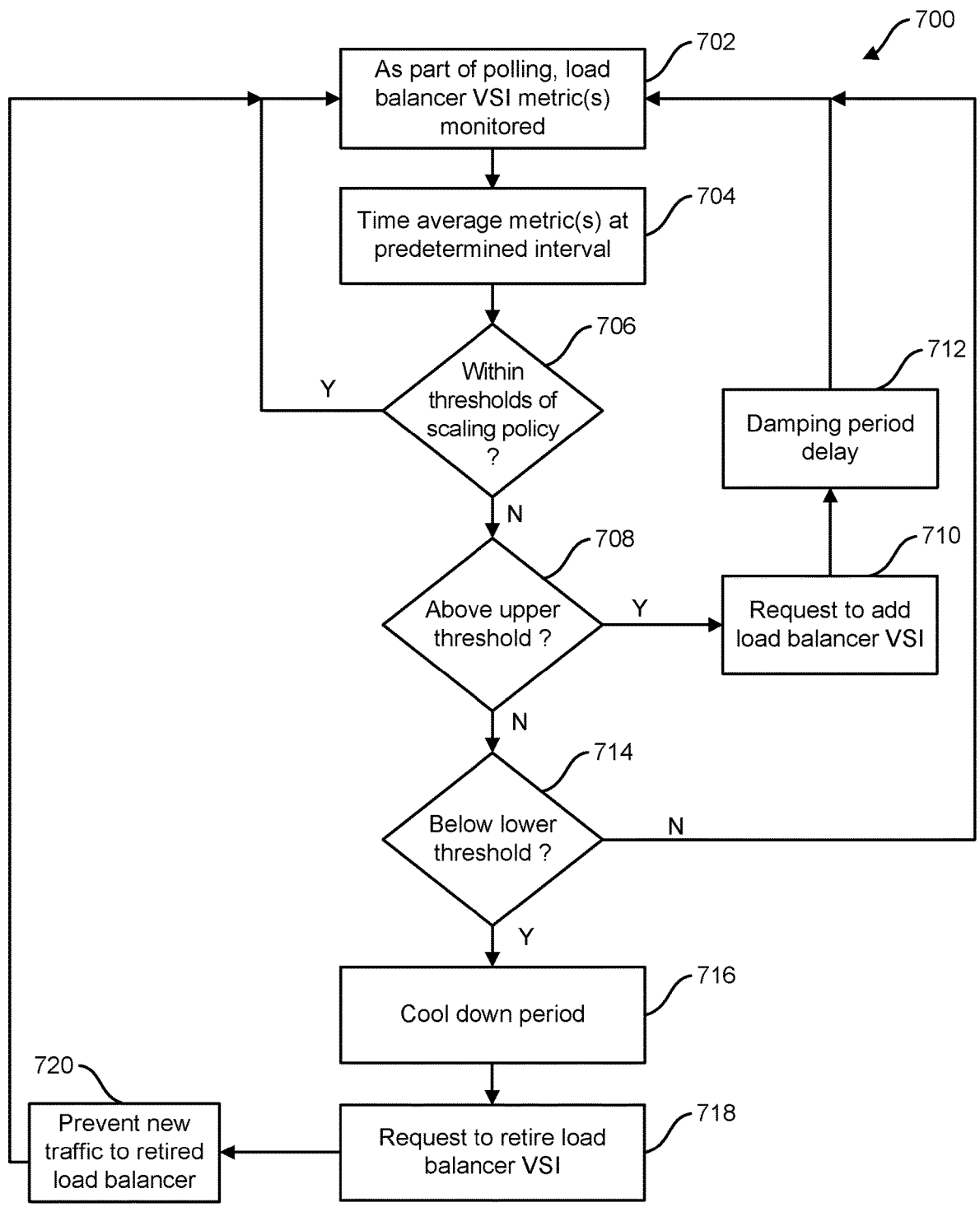
FIG. 7 is a flow diagram for one example of automatically adjusting the number of VCE load balancers, in accordance with one or more aspects of the present disclosure.

FIG. 7 is a flow diagram for one example of automatically adjusting the number of VCE load balancers, in accordance with one or more aspects of the present disclosure. As part of polling VCE load balancers as to health, for example, every 15 seconds, VCE load balancers monitor 702 one or more other metric(s). In one embodiment, VCE load balancers are partitioned among SVSIs such that each VCE load balancer is monitored by one SVSI. The one or more other VCE load balancer metric(s) monitored may include, for example, operation of a Central Processing Unit (CPU), memory use, and other metrics. Metrics are time-averaged 704 over a predetermined use interval, for example, a moving two-minute average of CPU. In one embodiment, a policy determines safe thresholds for the metrics monitored and each VCE load balancer or customer account has a scaling policy. A scaling policy could, for example, indicate that when the average CPU usage of all the VCE load balancers exceeds a certain threshold, then a scaling up action is needed. An inquiry 706 is then made as to whether the time average metric(s) is within the relevant scaling policy threshold(s). If the time average metric(s) is within the scaling policy threshold(s), then the method returns to monitoring 702 the VCE load balancer metric(s). If the time average metric(s) is not within the scaling policy threshold(s), then an inquiry 708 is made as to whether the time average metric(s) is above an upper threshold of the scaling policy. If the time average metric(s) is equal to or above the scaling policy upper threshold, then the relevant SVSI requests 710 to add VCE load balancer. Subsequently, after a damping period delay 712, the method returns to monitoring 702 the VCE load balancer metric(s). If the time average metric(s) is not above the scaling policy upper threshold, then an inquiry 714 is made as to whether the time average metric(s) is below a lower threshold of the scaling policy; if not, the method return to monitoring 702 the VCE load balancer metric(s). If the time average metric(s) is below the lower scaling policy threshold, then, after a cool-down 716 period, a request is made by the SVSI to retime 718 a VCE load balancer. Subsequently, after the retirement, new traffic to the retired VCE load balancer is prevented 720 and the method returns to monitoring 702 the VCE load balancer metric(s). A VCE load balancer being retired continues to carry existing traffic and continues to run to drain all the existing traffic. New traffic is not admitted to the retired VCE load balancer by removing its IP address from the VCE load balancers DNS name.

Certain embodiments herein may offer various technical computing advantages involving computing advantages to address problems arising in the realm of computer networks. Particularly, managing traffic on a distributed system. Embodiments herein manage traffic (or load) on VCE load balancers of a distributed system. Embodiments herein include service virtual server instances (SVSIs) managing the VCE load balancers. Embodiments herein include the SVSIs monitoring the load on VCE load balancers and automatically scaling (or elastically) the capacity of a given VCE load balancer under its watch, based on the current load. Embodiments herein increase, via the associated SVSI, the VCE load balancer capacity based on the current load on the VCE load balancer being above or equal to the current capacity of the VCE load balancer. Embodiments herein decrease, via the associated SVSI, the VCE load balancer capacity based on the current load on the VCE load balancer being below the current capacity of the VCE load balancer. Embodiments herein include automatically recovering from failures: SVSIs automatically recover from a failed associated VCE load balancer, as set forth with regard to FIGS. 5 and 6; and the master SVSI automatically recovers from an SVSI failure by repartitioning the VCE load balancers among remaining, healthy SVSIs (indicated, for example, in the Paxos value). Embodiments herein employ consistent-hashing to partition the VCE load balancers among the SVSIs. Embodiments herein utilize Paxos protocols, for example, a multi-Paxos protocol to solve consensus issues between the SVSIs. For example, embodiments herein utilize the multi-Paxos protocol for distributed state SVSIs and consensus among the SVSIs. Embodiments herein utilize a Paxos value used to update various statuses, for example, the master updates a value in the Paxos when obtaining/renewing the lese and when partitioning/repartitioning the VCE load balancers. Embodiments herein utilize the Paxos value to update items by the SVSIs, for example, current master SVSI IP address, a health status of each SVSI and partitioning of the VCE load balancers, i.e., which VCE load balancers are associated with a given SVSI.

Various decision data structures can be used to drive artificial intelligence (AI) decision making, such as decision data structure that cognitively maps social media interactions in relation to posted content in respect to parameters for use in better allocations that can include allocations of digital rights. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g. processing for transforming unstructured data into a form optimized for computerized processing. Embodiments herein can examine data from diverse data sources such as data sources. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making.

Figure 11:
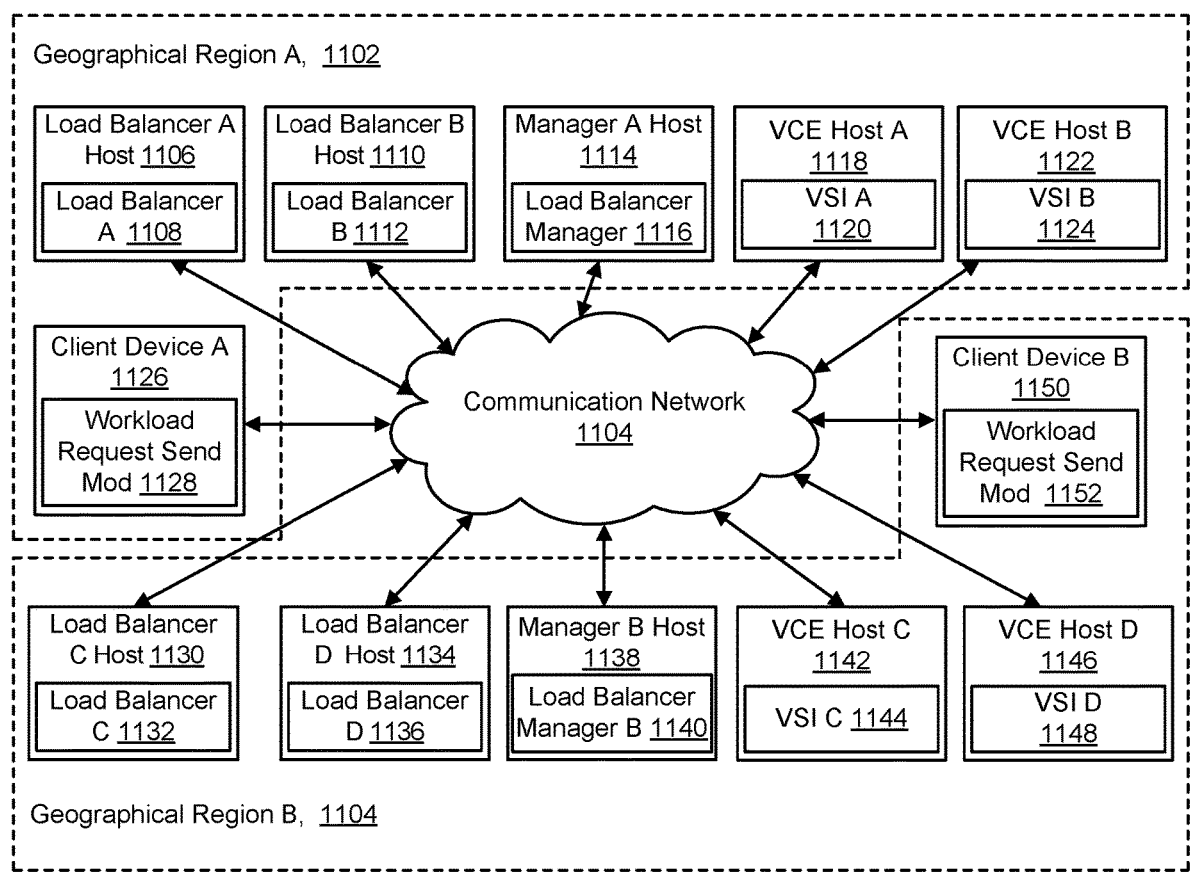
FIG. 11 is a simplified block diagram of one example of a distributed system, the traffic on which is managed, in accordance with one or more aspects of the present disclosure.

FIG. 11 is a simplified block diagram of one example of a distributed system 1100, the traffic on which is managed, in accordance with one or more aspects of the present disclosure. The distributed system spans more than one geographical region, for example, geographical regions 1102 and 1104 communicating over a communication network 1104, for example, a global computing network (e.g., the Internet). In geographical region 1102, there is shown a number of hosts, for example, a load balancer host 1106 hosting a load balancer 1108, another load balancer host 1110 hosting a load balancer 1112, a manager host 1114 hosting a load balancer manager 1116, a VCE host 1118 hosting a VSI 1120, and a second VCE host 1122 hosting a VSI 1124. In addition, geographical region 1102 includes a client device 1126, which includes a workload request send module 1128. In geographical region 1104, there is shown a number of hosts, for example, a load balancer host 1130 hosting a load balancer 1132, another load balancer host 1134 hosting a load balancer 1136, a manager host 1138 hosting a load balancer manager 1140, a VCE host 1142 hosting a VSI 1144, and a second VCE host 1146 hosting a VSI 1148. In addition, geographical region 1150 includes a client device 1152, which includes a workload request send module(s) 1154.

In operation, when a client sends a workload request to a server for processing over the communication network, the request is intercepted by a load balancer, who decides what server is to get the request. The load balancers in each region of this example are collectively managed by a load balancer manager. In the present example, in each geographical region, there is one load balancer manager, two load balancers and two VSIs. There is also one client in each geographical region. It will be understood, however, that this is solely for simplification and there could be more or less of any of the components noted, with the exception of the VSIs. There should be at least two VSIs in the distributed network (e.g., one in each region); otherwise, managing the load among available servers would not be needed. For example, there could be a single load balancer manager for both geographical regions. As another example, there could be many more clients.

Figure 12:
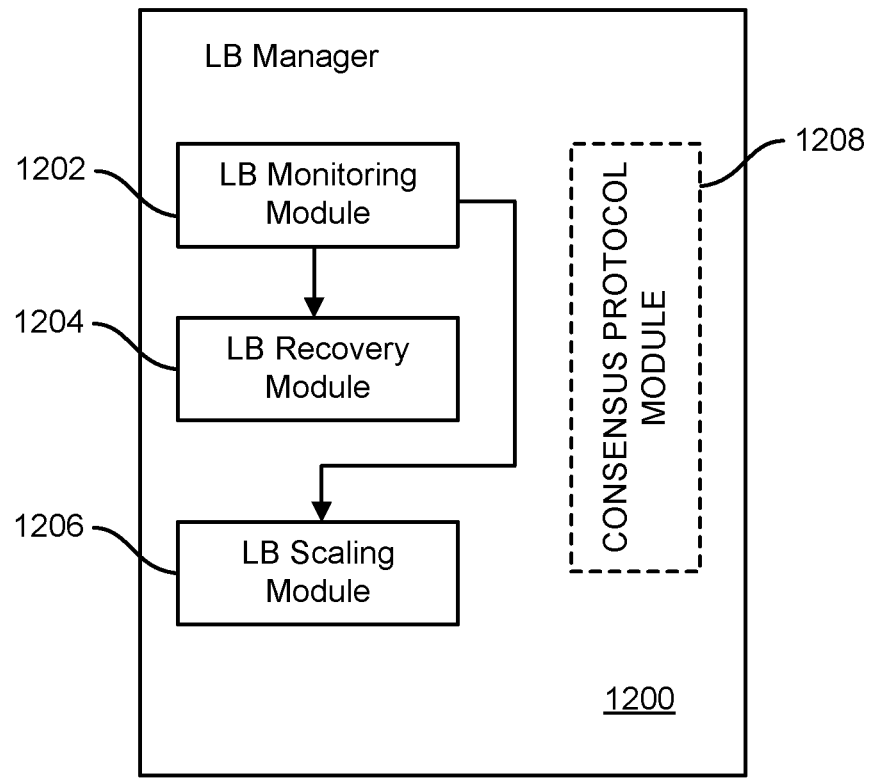
FIG. 12 is a simplified block diagram of one example of a load balancer manager of FIG. 11 in more detail, in accordance with one or more aspects of the present disclosure.

FIG. 12 is a simplified block diagram of one example of a load balancer manager (LBM) 1200, in accordance with one or more aspects of the present disclosure. The LBM includes, for a load balancer (LB) monitoring module 1202, a LB recovery module 1204 and a LB scaling module 1206. In the case that the SVSIs are stateful, a consensus protocol module 1208 is included. As described above, in the SVSI stateful case, a master SVSI controls partitioning of the VCE load balancers and monitors the other SVSIs for health. In the stateless case, each SVSI obtains the VCE load balancers for which it is responsible and partitions them to itself. The LB monitoring module is tasked with monitoring a health of and load on each VCE load balancer for which it is responsible. If one of those VCE load balancers is not or suspected of not being healthy, the LB monitoring module communicates this to the LB recovery module, which then attempts to recover the unhealthy VCE load balancer. If the LB monitoring module detects a load on a given VCE load balancer that is at or above a predetermined capacity level (e.g., 80 percent of fill capacity), it may divert the excess load to another VCE load balancer or, if the other VCE load balancers for which the LB manager is responsible are also at or above capacity, it communicates this to the LB scaling module. The LB scaling module is tasked with adding or removing VCE load balancers, based on current load. Based on the load information communicated to it by the LB monitoring module, the LB scaling module adjusts the number of VCE load balancers. Where the LB monitoring module determines that more capacity is needed, the LB scaling module adds one or more VCE load balancers for which the LB manager will be responsible. In the case that the LB monitoring module finds one of its VCE load balancers is at or below a predetermined capacity level (e.g., 20 percent of full capacity) and its other VCE load balancers are not currently overloaded, then the LB monitoring module will communicate this to the LB scaling module, which will proceed to retire the underutilized VCE load balancer and its load is redistributed.

In a first aspect, disclosed above is a method of managing traffic on a distributed system. The method includes: partitioning load balancer virtual server instance (VSIs) of the distributed system among service virtual server instances (SVSIs) of the distributed system, each service virtual server instance (SVSI) being identical in function and deployed across two or more regions of the distributed system; periodically polling, by each SVSI, each other of the SVSIs as to health; monitoring, by each SVSI, a load on each VCE load balancer for which it is responsible, resulting in a monitored load; recovering, by an SVSI from a failure of VCE load balancer(s) for which it is responsible; automatically adjusting, by an SVSI a number of VCE load balancers of the distributed system for which it is responsible based, at least in part, on a corresponding monitored load; and repartitioning, by the distributed system, in response to an SVSI failure, the VCE load balancers among remaining healthy SVSIs.

In one example, the SVSIs may be, for example, stateful and one of the SVSIs may be, for example, a master SVSI and the master SVSI performs the partitioning.

In one example, the recovering in the method of the first aspect may include, for example, polling a VCE load balancer suspected of failure by each of the SVSIs; rejecting the failure upon healthy poll result(s) for the VCE load balancer; and initiating recovery for the VCE load balancer in response to confirmation of failure of the VCE load balancer.

In one example, the SVSIs in the method of the first aspect may be, for example, stateless, and the partitioning may be performed, for example, by each SVSI independently using a same partitioning algorithm. In one example, the partitioning algorithm may include, for example, consistent-hashing.

In one example, the method of the first aspect may further include, for example, each of the SVSIs keeping a record with timestamp regarding its health status.

In one example, the monitoring in the method of the first aspect may include, for example, polling each VCE load balancer for which a given SVSI of the SVSIs is responsible as to health, current load and other metric(s); and the automatically adjusting may include, for example, automatically adjusting based in part on the corresponding monitored load and based in part on the other metric(s) meeting threshold(s) in an associated scaling policy.

In one example, the monitoring in the method of the first aspect may include, for example, polling each VCE load balancer for which a given SVSI is responsible as to health and current load, and the automatically adjusting may include, for example: automatically increasing, by the given SVSI, a number of VCE load balancers having a current load equaling or exceeding a current capacity of the VCE load balancer; and automatically decreasing, by the given SVSI, a number of VCE load balancers having a current load below a current capacity of the VCE load balancer.

In one example, the method of the first aspect may further include, for example, using, by the SVSIs, a protocol for consensus. In one example, the protocol may include, for example, a Paxos protocol.

In a second aspect, disclosed above is a distributed system for managing traffic. The distributed system includes: service virtual server instances (SVSIs), each service virtual server instance (SVSI) being identical in function and deployed across two or more regions of the distributed system; and VCE load balancers, the distributed system being configured to partition the VCE load balancers among the SVSIs. and each SVSI of the SVSIs being configured to: periodically poll each other of the SVSIs as to health; monitor a load on each VCE load balancer for which it is responsible, resulting in a monitored load; recover from a failure of VCE load balancer(s) of the for which it is responsible; automatically adjust a number of VCE load balancers for which it is responsible, based, at least in part, on a corresponding monitored load; and the distributed system being further configured to repartition, in response to an SVSI failure, the VCE load balancers among remaining healthy SVSIs.

In one example, the SVSIs are stateful, and one of the SVSIs is a master SVSI and the master SVSI performs the partitioning.

In one example, the SVSIs in the distributed system of the second aspect may be, for example, stateless, and the partitioning may be, for example, performed by each SVSI independently using a same partitioning algorithm.

In one example, the recovering in the distributed system of the second aspect may include, for example, polling a VCE load balancer suspected of a failure by each of the SVSIs; rejecting the failure upon healthy poll result(s) or failure poll result(s) for the VCE load balancer; and initiating a recovery for the VCE load balancer in response to confirmation of failure of the VCE load balancer.

In one example, the monitoring in the distributed system of the second aspect may include, for example, polling each VCE load balancer for which a given SVSI of the SVSIs is responsible as to health, current load and other metric(s); and the automatically adjusting may include, for example, automatically adjusting based in part on the corresponding monitored load and based in part on the other metric(s) meeting threshold(s) in an associated scaling policy.

In a third aspect, disclosed above is a method. The method includes defining geographic regions, for each geographic region: deploying load balancer programs on load balancer host computers; deploying load balancer manager program (s) on a set of load balancer manager host computer(s); instantiating virtual server instances on virtual server instance host computers; performing by each given loadbalancer program of the loadbalancer programs of each geographic region of the geographic regions at least the following operation(s): intercepting and routing client requests among virtual server instances in order to balance processing of the client requests; performing by each given loadbalancer manager program of the set of loadbalancer manager program(s) of each geographic region of the geographic regions at least the following operation(s): monitoring a load on load balancer program(s) and horizontally scaling the load balancer program(s) based on the load; and performing by each given virtual service instance of the virtual service instances of each geographic region of the geographic regions at least the following operation(s): processing one or more client request of the client requests routed to the given virtual server instance.

In one example, the following components are provided as part of a service: the virtual server instances being hosted, the load balancer programs being hosted and the load balancer manager program(s) being hosted.

In one example, each virtual server instance in the method of the third aspect may be, for example, a virtual machine that is a virtualized computer.

In one example, each virtual server instance in the method of the third aspect may be, for example, a container that is a virtualized computer and a virtualized operating system. In one example, each virtual server instance is a Docker container.

Figure 8:
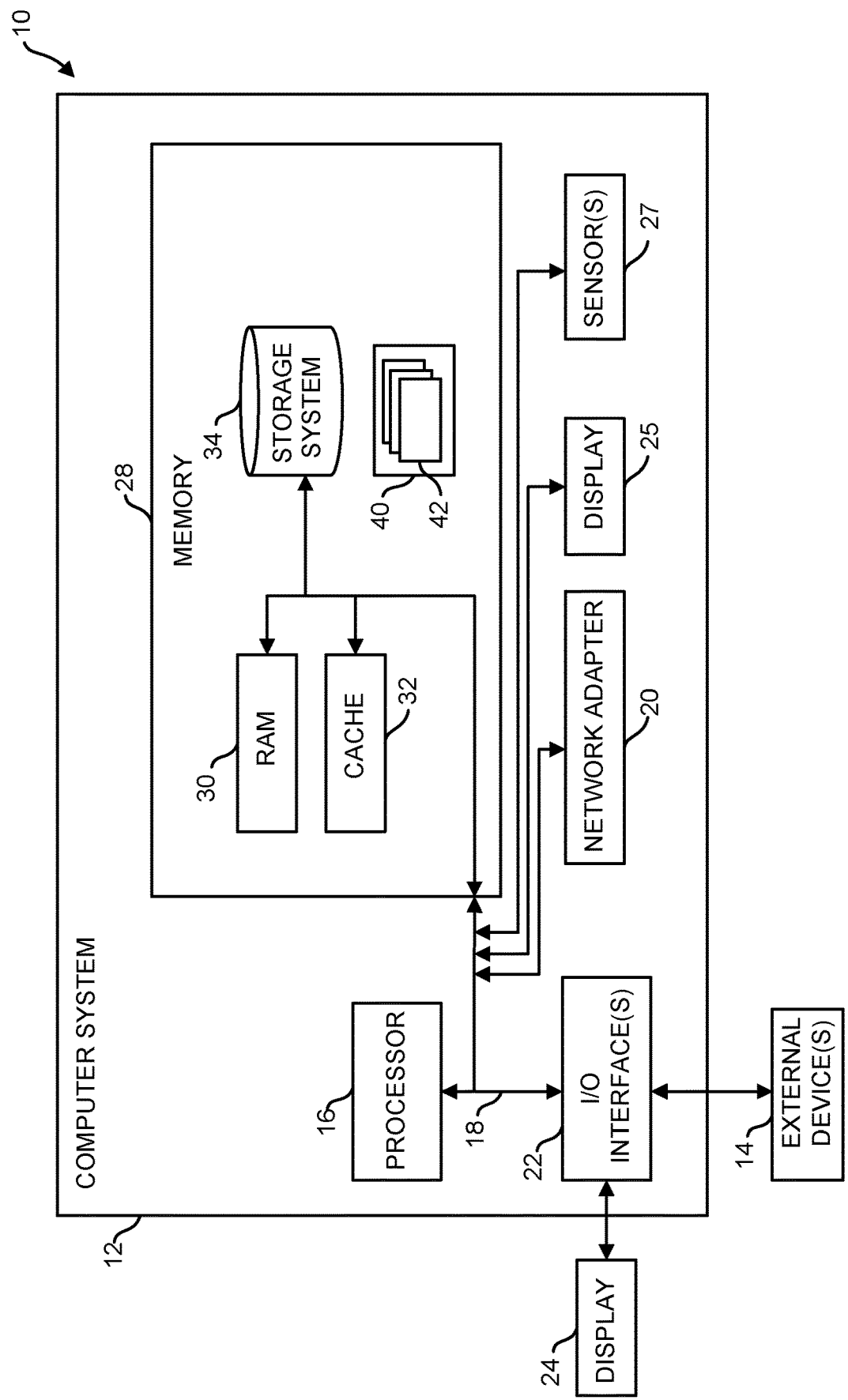
FIG. 8 is a block diagram of one example of a computer system, in accordance with one or more aspects of the present disclosure.
Figure 9:
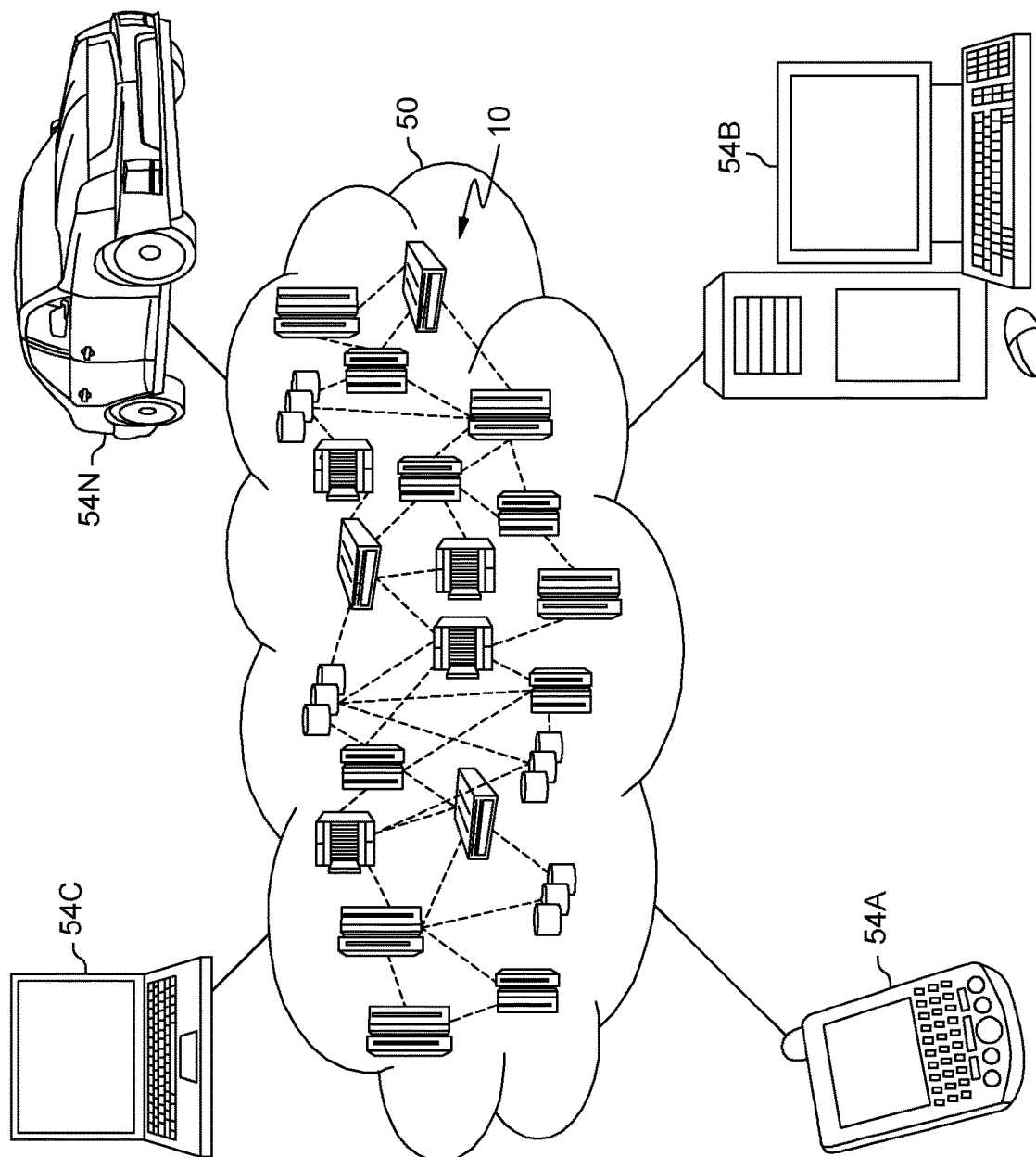
FIG. 9 is a block diagram of one example of a cloud computing environment, in accordance with one or more aspects of the present disclosure.
Figure 10:
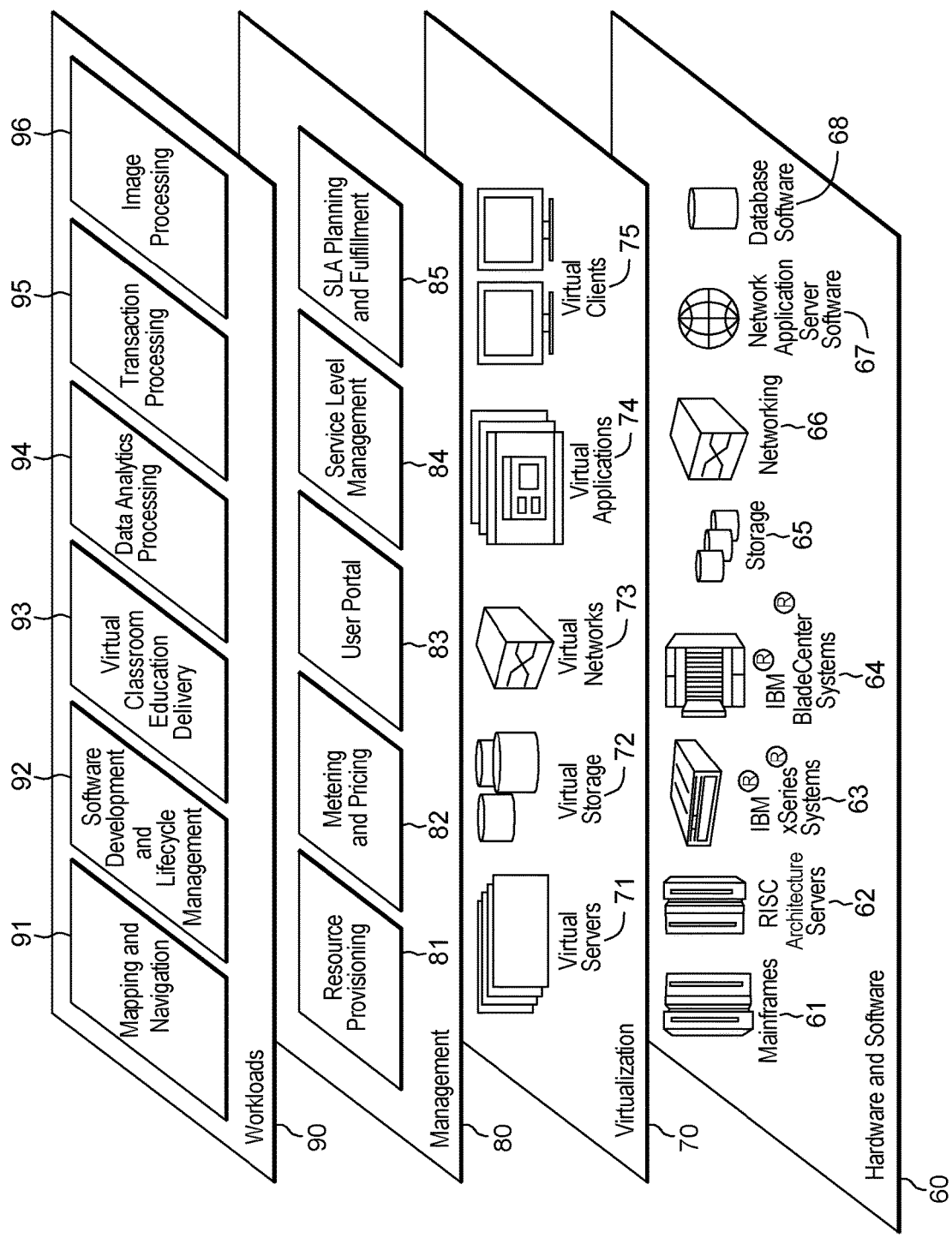
FIG. 10 is a block diagram of one example of functional abstraction layers of the cloud computing environment of FIG. 9, in accordance with one or more aspects of the present disclosure.

FIGS. 8-10 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud instance. The applications are accessible from various client devices through a thin client interface such as a web browser (e.g., web-based e-mail). The consumer does not manage or control the underlying cloud instance including network, servers, operating systems, storage, or even individual application capabilities, with the possible exception of limited user-specific application configuration settings.

Platform as a Service (PaaS): the capability provided to the consumer is to deploy onto the cloud instance consumer-created or acquired applications created using programming languages and tools supported by the provider. The consumer does not manage or control the underlying cloud instance including networks, servers, operating systems, or storage, but has control over the deployed applications and possibly application hosting environment configurations.

Instance as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud instance but has control over operating systems, storage, deployed applications, and possibly limited control of select networking components (e.g., host firewalls).

Deployment Models are as follows:

Private cloud: the cloud instance is operated solely for an organization. It may be managed by the organization or a third party and may exist on-premises or off-premises.

Community cloud: the cloud instance is shared by several organizations and supports a specific community that has shared concerns (e.g., mission, security requirements, policy, and compliance considerations). It may be managed by the organizations or a third party and may exist on-premises or off-premises.

Public cloud: the cloud instance is made available to the general public or a large industry group and is owned by an organization selling cloud services.

Hybrid cloud: the cloud instance is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an instance comprising a network of interconnected nodes.

Referring now to FIG. 8, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 8, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 9-10.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. One or more program 40 including program processes 42 can define machine logic to carry out the functions set forth herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 9 computing node 10 is described as being implemented in a cloud computing environment and accordingly is referred to as a cloud computing node in the context of FIG. 9.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer instance, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for establishing and updating geofence locations as set forth herein. The processing components 96 can be implemented with use of one or more program 40 described in FIG. 5.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

Some embodiments of the present invention may include one, or more, of the following features, characteristics, advantages and/or operations: (i) partitioning monitored loadbalancers using consistent hashing; (ii) re-partitioning monitored loadbalancers upon a failure of the service VSI (as illustrated in FIG. 2 and the associated discussion of that figure herein); (iii) a stateful embodiment of what is illustrated in FIG. 4 (and the associated discussion of that Figure herein); (iv) consensus algorithm for recovery upon failure to eliminate false-positives (as illustrated in FIG. 5 and associated discussion); and/or (v) recovering the failed loadbalancer VSI involving a sequence of steps of increasing complexity as (illustrated in FIG. 6 and associated discussion).

The invention claimed is:

1. A method of managing traffic on a distributed system, the method comprising:
partitioning a plurality of load balancer virtual server instances (VSIs) of the distributed system among a plurality of service virtual server instances (SVSIs) of the distributed system, each service virtual server instance (SVSI) being identical in function and deployed across two or more regions of the distributed system;
periodically polling, by each SVSI of the plurality of SVSIs, each other of the plurality of SVSIs as to health;
monitoring, by each SVSI, a load on each Virtualized Computing Environment (VCE) load balancer for which it is responsible, resulting in a monitored load;
recovering, by an SVSI of the plurality of SVSIs, from a failure of one or more VCE load balancers for which it is responsible;
automatically adjusting, by an SVSI of the plurality of SVSIs, a number of VCE load balancers of the distributed system for which it is responsible based, at least in part, on a corresponding monitored load; and
repartitioning, by the distributed system, in response to an SVSI failure, the plurality of VCE load balancers among remaining healthy SVSIs of the plurality of SVSIs.

2. The method of claim 1, wherein the plurality of SVSIs are stateful, wherein one of the plurality of SVSIs is a master SVSI and wherein the master SVSI performs the partitioning.

3. The method of claim 1, wherein the recovering comprises:
polling a Virtualized Computing Environment (VCE) load balancer suspected of failure by each of the plurality of SVSIs;
rejecting the failure upon one or more healthy poll result or one or more failure poll result for the VCE load balancer; and
initiating recovery for the VCE load balancer in response to confirmation of failure of the VCE load balancer.

4. The method of claim 1, wherein the plurality of SVSIs are stateless, and wherein the partitioning is performed by each SVSI independently using a same partitioning algorithm.

5. The method of claim 4, wherein the partitioning algorithm comprises consistent-hashing.

6. The method of claim 1, further comprising each of the plurality of SVSIs keeping a record with timestamp regarding its health status.

7. The method of claim 1, wherein the monitoring comprises polling each Virtualized Computing Environment (VCE) load balancer for which a given SVSI of the plurality of SVSIs is responsible as to health, current load and one or more other metric; and wherein the automatically adjusting comprises automatically adjusting based in part on the corresponding monitored load and based in part on the one or more other metric meeting one or more threshold in an associated scaling policy.

8. The method of claim 1, wherein the monitoring comprises polling each Virtualized Computing Environment (VCE) load balancer for which a given SVSI of the plurality of SVSIs is responsible as to health and current load, and wherein the automatically adjusting comprises:
automatically increasing, by the given SVSI, a number of VCE load balancers having a current load equaling or exceeding a current capacity of the VCE load balancer; and
automatically decreasing, by the given SVSI, a number of VCE load balancers having a current load below a current capacity of the VCE load balancer.

9. The method of claim 1, further comprising using, by the plurality of SVSIs, a protocol for consensus.

10. The method of claim 9, wherein the protocol comprises a Paxos protocol.

11. A distributed system for managing traffic, the distributed system comprising:
a plurality of service virtual server instances (SVSIs), each service virtual server instance (SVSI) being identical in function and deployed across two or more regions of the distributed system; and
a plurality of Virtualized Computing Environment (VCE) load balancers;
wherein the distributed system is configured to partition the plurality of VCE load balancers among the plurality of SVSIs;
wherein each SVSI of the plurality of SVSIs is configured to:
periodically poll each other of the plurality of SVSIs as to health;

monitor a load on each VCE load balancer for which it is responsible, resulting in a monitored load;

recover from a failure of one or more VCE load balancers of the plurality of load balancers VSIs for which it is responsible;

automatically adjust a number of VCE load balancers for which it is responsible, based, at least in part, on a corresponding monitored load; and wherein the distributed system is further configured to repartition, in response to an SVSI failure, the plurality of VCE load balancers among remaining healthy SVSIs of the plurality of SVSIs.

12. The distributed system of claim 11, wherein the plurality of SVSIs are stateful, and wherein one of the plurality of SVSIs is a master SVSI and wherein the master SVSI performs the partitioning.

13. The distributed system of claim 11, wherein the plurality of SVSIs are stateless, and wherein the partitioning is performed by each SVSI independently using a same partitioning algorithm.

14. The distributed system of claim 11, wherein the recovering comprises:

polling a Virtualized Computing Environment (VCE) load balancer suspected of a failure by each of the plurality of SVSIs;

rejecting the failure upon one or more healthy poll result or one or more failure poll result for the VCE load balancer; and initiating a recovery for the VCE load balancer in response to confirmation of failure of the VCE load balancer.

15. The distributed system of claim 11, wherein the monitoring comprises polling each Virtualized Computing Environment (VCE) load balancer for which a given SVSI of the plurality of SVSIs is responsible as to health, current load and one or more other metric; and wherein the automatically adjusting comprises automatically adjusting based in part on the corresponding monitored load and based in part on the one or more other metric meeting one or more threshold in a scaling policy.

16. A method comprising:
defining a plurality of geographic regions;
for each geographic region of the plurality of geographic regions:
  deploying a plurality of load balancer programs on a plurality of load balancer host computers;
  deploying at least one load balancer manager program on a set of load balancer manager host computer(s);
  instantiating a plurality of virtual server instances on a plurality of virtual server instance host computers;
  performing by each given loadbalancer program of the plurality of loadbalancer programs of each geographic region of the plurality of geographic regions at least the following operation(s): intercepting and routing client requests among a plurality of virtual server instances in order to balance processing of the client requests;
  performing by each given loadbalancer manager program of the set of loadbalancer manager program(s) of each geographic region of the plurality of geographic regions at least the following operation(s): monitoring a load on one or more load balancer program and horizontally scaling the one or more load balancer program based on the load; and
  performing by each given virtual service instance of the plurality of virtual service instance of each geographic region of the plurality of geographic regions at least the following operation(s): processing one or more client request of the plurality of client requests routed to the given virtual server instance.

17. The method of claim 16, wherein the following components are provided as part of a service: the plurality of virtual server instances being hosted, the plurality of load balancer programs being hosted and the at least one load balancer manager program being hosted.

18. The method of claim 16, wherein each virtual server instance is a virtual machine that is a virtualized computer.

19. The method of claim 16, wherein each virtual server instance is a container that is a virtualized computer and a virtualized operating system.

20. The method of claim 19, wherein each virtual server instance is a Docker container.

* * * * *